United States Patent
Hu et al.

(10) Patent No.: US 9,874,164 B2
(45) Date of Patent: Jan. 23, 2018

(54) APPARATUS AND METHOD FOR CONTROLLING AIR SYSTEM OF DIESEL ENGINE

(75) Inventors: Guangdi Hu, Shandong (CN); Dehui Tong, Shandong (CN)

(73) Assignee: WEICHAI POWER CO., LTD., Weifang, Shandong (CN)

( * ) Notice: Subject to any disclaimer, the term of this patent is extended or adjusted under 35 U.S.C. 154(b) by 900 days.

(21) Appl. No.: 14/241,428

(22) PCT Filed: Aug. 26, 2011

(86) PCT No.: PCT/CN2011/078984
§ 371 (c)(1),
(2), (4) Date: Nov. 21, 2014

(87) PCT Pub. No.: WO2013/029216
PCT Pub. Date: Mar. 7, 2013

(65) Prior Publication Data
US 2015/0337748 A1  Nov. 26, 2015

(51) Int. Cl.
*F02D 41/00* (2006.01)
*F02B 37/12* (2006.01)
(Continued)

(52) U.S. Cl.
CPC .......... *F02D 41/0052* (2013.01); *F02B 37/12* (2013.01); *F02D 41/0072* (2013.01);
(Continued)

(58) Field of Classification Search
CPC ............. F02B 37/12; F02D 2041/1427; F02D 41/0007; F02D 41/0052; F02D 41/0072;
(Continued)

(56) References Cited

U.S. PATENT DOCUMENTS 5,205,260 A * 4/1993 Takahashi ........... F02D 41/0072
123/492
5,920,478 A * 7/1999 Ekblad ................... G05B 11/32
318/139
(Continued)

FOREIGN PATENT DOCUMENTS

CN 101526042 A 9/2009
CN 101809274 A 8/2010
(Continued)

OTHER PUBLICATIONS

PCT International Search Report and Written Opinion, PCT Application No. PCT/CN2011/078984, dated May 3, 2012, twenty-two pages.
(Continued)

*Primary Examiner* — Carlos A Rivera
*Assistant Examiner* — Carl Staubach
(74) *Attorney, Agent, or Firm* — Fenwick & West LLP (57) ABSTRACT

An apparatus for controlling an air system of a diesel engine in a steady state. The air system comprises a waste gas recycling system and a turbocharging system. The apparatus comprises: a working condition acquisition device, configured to acquire a parameter for indicating an practical working condition of a diesel engine; a decoupling calculation device (204), coupled to the working condition acquisition device, and configured to, according to the parameter from the working condition acquisition device and a transfer function characterizing the diesel engine, calculate a decoupling transfer function, the transfer function being calibrated based on working condition data of the diesel engine in a steady working zone thereof; an air system parameter processing device (206), coupled to the working condition acquisition device, and configured to process a parameter for indicating a state of the air system; and a signal generation device (208), coupled to the decoupling calculation device
(Continued)

and the air system parameter processing device, and configured to, according to the decoupling transfer function from the decoupling computation device and a processing result from the air system parameter processing device, generate a first drive signal for the waste gas recycling system and a second drive signal used for the turbocharging system.

19 Claims, 6 Drawing Sheets

(51) Int. Cl.
    *F02D 41/26*     (2006.01)
    *F02D 43/00*     (2006.01)
    *F02D 41/14*     (2006.01)
    *F02M 26/05*     (2016.01)

(52) U.S. Cl.
    CPC ....... *F02D 41/1401* (2013.01); *F02D 41/263* (2013.01); *F02D 43/00* (2013.01); *F02M 26/05* (2016.02); *F02D 41/0007* (2013.01); *F02D 41/0077* (2013.01); *F02D 2041/1427* (2013.01); *Y02T 10/144* (2013.01); *Y02T 10/47* (2013.01)

(58) Field of Classification Search
    CPC ............. F02D 41/0077; F02D 41/1401; F02D 41/263; F02D 43/00; F02D 2041/1415; F02D 2041/14; F02M 26/05; Y02T 10/144; Y02T 10/47
    USPC ......... 701/101–103, 108, 109; 123/681–684, 123/568.11, 568.19, 568.21; 60/605.1, 60/605.2
    See application file for complete search history.

(56) References Cited

U.S. PATENT DOCUMENTS

| | | | |
|---|---|---|---|
| 6,408,834 B1* | 6/2002 | Brackney | F02D 41/0007 123/568.21 |
| 7,934,492 B2 | 5/2011 | Gerum | |
| 2004/0084015 A1* | 5/2004 | Sun | F02D 35/0007 123/399 |
| 2008/0208432 A1* | 8/2008 | Hu | F02B 37/16 701/103 |
| 2010/0170244 A1* | 7/2010 | Brooks | F02D 21/08 60/602 |
| 2010/0175671 A1 | 7/2010 | Gerum | |
| 2012/0024270 A1* | 2/2012 | Wang | F02D 41/0007 123/568.21 |
| 2012/0173118 A1* | 7/2012 | Wang | F02D 41/0002 701/102 |
| 2014/0000573 A1* | 1/2014 | Hu | F02D 41/0007 123/568.19 |
| 2014/0109570 A1* | 4/2014 | Hu | F02D 41/0007 60/605.1 |

FOREIGN PATENT DOCUMENTS

| | | |
|---|---|---|
| CN | 102297032 A | 12/2011 |
| EP | 1077320 A2 | 2/2001 |
| JP | 2001-123873 A | 5/2001 |

OTHER PUBLICATIONS

PCT International Preliminary Report on Patentability, PCT Application No. PCT/CN2011/078984, dated Mar. 4, 2014, sixteen pages.

\* cited by examiner

APPARATUS AND METHOD FOR CONTROLLING AIR SYSTEM OF DIESEL ENGINE

FIELD OF THE INVENTION

Embodiments of the present invention generally relate to a diesel engine, and more specifically, relate to an apparatus and a method for controlling an air system of a diesel engine.

BACKGROUND OF THE INVENTION

With the continuous development of engine theories and technologies, an exhaust gas recirculation (EGR) system has become an important component in a diesel engine. The exhaust gas emitted from a diesel engine generally contains a great amount of nitrogen oxides (NOx), which is a major source for air pollution. With the EGR system, a part of exhaust gas generated by the diesel engine is fed back to cylinders. Since the recirculation exhaust gas is inertia, it will delay the combustion process, decelerate the combustion speed somewhat, and then slow down the pressure formation process in the combustion chamber, thereby effectively reducing the nitrogen oxides. Besides, promotion of the exhaust gas recirculation ratio will reduce the overall exhaust gas flow, thereby reducing the total pollutants output amount in the exhaust gas emission.

Besides EGR, in order to enhance the power performance of the diesel engine and improve combustion, a turbocharging system is also one of important components in modern diesel engines. For example, a common turbocharging system is a variable geometry turbocharger (VGT). The turbocharing system is essentially an air compression system, which increases the intake air amount in the diesel engine cylinders through compressing air. It is driven by the impulsion from the exhaust air emitted from the engine. The pressure is transmitted to an air compressor by devices such as a turbocharger rotating shaft, such that the newly input air is effectively supercharged before entering into the cylinders.

In a diesel engine equipped with both the EGR and the turbocharging system, the coupling characteristic therebetween poses a challenge to the control of air system. In the diesel engine equipped with both the exhaust gas recirculation system EGR and the turbocharging system, for the EGR system, precise control of the EGR ratio and intake air temperature is crucial to improve NOx emission and reduce its impact on particles, power, and cost-effectiveness. In such an engine, the flow of the input exhaust gas of an EGR cooler is controlled by an EGR valve. Both the inlet end of the EGR valve and the turbo inlet of the turbocharger receive the engine exhaust gas emitted from an exhaust pipe. It would be appreciated that besides the variation of the opening degree of the EGR valve itself, the change of the supercharging pressure and exhaust back pressure caused by the charging system would also generate an impact on the EGR flow ratio. On the other hand, the variation of the opening degree of the EGR valve would also generate an impact on the inlet flow ratio of the input supercharger. In other words, the exhaust gas recirculation system and the supercharging system are two mutually dependent and mutually influencing systems, i.e., having a coupling characteristic.

The coupling characteristic of the exhaust gas recirculation system and the supercharging system is always a challenge for air system control of a diesel engine, and a multi-variant control strategy controlling the two is also always a research focus of the air system control strategy of the diesel engine. The prior art has proposed several known control strategies, which are simply summarized below:

(1) an independent control strategy for the exhaust gas recirculation system and the supercharging system, i.e., with the supercharging pressure as the control target, driving the supercharging valve by a PID (proportion-integration-differentiation) control plus transient feed-forward control strategy so as to enable the actual supercharging pressure to reach a target value; with the flow of air as the control target, driving the EGR valve through PID control plus transient feed-forward control policy so as to enable the actual flow of air to reach the target value.

(2) With the intake air flow and the supercharging pressure as control targets, perform local linearization to the average value mode of the air system, design an optimal or robust controller based on the linear model, further extend to the whole working condition scope, thereby obtaining a non-linear control strategy, such as H infinity control, a controller design method based on Lyapunov stability theory, minimum quadratic model optimal state feedback control law, and sliding mode controller, etc.

(3) With the intake air flow and the supercharging pressure as control targets, basing on controller design methods of a non-analytic model, such as, a fuzzy logic control method, a control method according to a neural network, etc.

(4) With the intake air flow and the supercharging pressure as control targets, employing model prediction control methods, i.e., integrating a mathematic model of a controlled object in the controller, predicting a future multi-step system output through the model, building a target function based on the offset between the predicted value and the target value, and minimizing the target function by iteratively evaluating the current control amount.

(5) With the air-fuel ratio and the mass fraction of the exhaust gas in the intake air pipe as the control targets, adopting the air system reduced-rank de-coupling control strategy, i.e., the transmission function matrix of the air system is reduced-ranking in some cases; thus, the two control targets have a certain relationship, such that the original two-dimensional control strategy may be converted into a simpler one-dimensional control strategy.

The major advantages of the independent PID control strategy (1) based on the air flow and supercharging pressure lie in a simpler structure, the capability of implementing a good steady-state control effect, and less experimental workload for parameter calibration. The challenge of the independent closed-ring PIC control lies in that the coupling characteristic of the system per se causes unsatisfactory control effect in its dynamic process, and smoking phenomenon likely appears during the acceleration process. Another drawback of independently working closed-ring control lies in that the EGR working scope is limited, because the EGR valve can only work when the pressure before turbo is higher than the supercharging pressure; therefore, it is only applicable to medium-low load and medium-low rotating speed working condition. Nissan, Toyota, Cummmins, and other companies do not adopt the air flow and supercharging pressure as the target values during the practical use, but adopt a control strategy with the EGR ratio instead of supercharging pressure as the target value.

A common problem between the above methods is EGR flow estimate. Since the EGR flow sensor cannot satisfy the need of actual use by far in terms of precision and reliability, the EGR flow is mainly obtained by estimation. Besides, for temperature and pressure of the exhaust pipe, the EGR pipe throttling coefficient, and cooling efficiency and the like that have an impact on EGR flow, they all require a considerable amount of experiments to obtain a satisfactory estimation effect; therefore, the control system experiment according to this method would be an enormous work. Although the above control strategies can achieve a sound effect in a steady-state control, since the exhaust gas recirculation system and the supercharging system simultaneously act on the intake air pipe and thus have a coupling characteristic, while those control strategies fail to design a transient control strategy for the coupling characteristic, their transient control effect is always unsatisfactory.

There is an apparent contradiction between the precision requirement and the concise requirement of the air system control strategy for the control strategies (2)-(4) with intake air flow and supercharging pressure as control targets. This contradiction is directly caused by the strong coupling and non-linear correlation between the exhaust gas recirculation system and the supercharging system. The independent closed-ring control policy based on the air flow and supercharging pressure, as well as its variations, cannot satisfy the steady-state and transient performance requirements. Various theoretical study outcomes, due to the complexity of control strategies, the requirements of control hardware, and the difficulties in parameter calibration, and other factors, are not suitable for the requirements of an actual control system.

The control strategy (5) with the air-fuel ratio and the mass fraction of the exhaust gas within the intake air pipe as the control targets, due to lack of a mature commercial sensor that directly measures the air-fuel ratio and the mass fraction of the exhaust gas within the intake air pipe during the practical use process, cannot realize a feedback control with the parameters as the control targets. Further, air flow and supercharging pressure can be very easily measured by existing sensors; thus, a feedback control strategy may be built based on the air flow and the supercharging pressure; the air-fuel ration and exhaust gas mass fraction within an intake air pipe, as intermediate variants, may be obtained through an observer. However, the state observer would introduce time delay and error, which are disadvantageous to transient operation control.

In view of the above, the control strategies for an air system of a diesel engine in the prior art cannot simultaneously satisfy well the steady-state and transient working condition performances during the actual operation of the diesel engine or the requirements of the exhaust and the calibration of diesel engine control unit (ECU).

Therefore, it is desirable in this field for an air system control strategy that can satisfy the actual working condition of a diesel engine, is relatively simple and can be easily implemented and calibrated.

SUMMARY OF THE INVENTION

In order to overcome the above drawbacks existing in the prior art, embodiments of the present invention provide an apparatus and a method for controlling an air system of a diesel engine more effectively in a steady state.

According to one aspect of the present invention, there is provided an apparatus for controlling an air system of a diesel engine in a steady state, wherein the air system comprises an exhaust gas recirculation system and a tubrocharging system. The apparatus comprises: a working condition acquisition device configured to acquire a parameter indicating an actual working condition of the diesel engine; a decoupling computation device coupled to the working condition acquisition device and configured to compute a decoupling transfer function based on the parameter from the working condition acquisition device and a transfer function characterizing the diesel engine, wherein the transfer function is calibrated based on working condition data of the diesel engine in its steady working area; an air system parameter processing device coupled to the working condition acquisition device and configured to process a parameter indicating a state of the air system; and an air signal generation device coupled to the decoupling computation device and the air system parameter processing device and configured to generate a first driving signal for the exhaust gas recirculation system and a second driving signal for the turbocharing system based on the decoupling transfer function from the decoupling computation device and a processing result from the air system parameter processing device.

According to another aspect of the present invention, there is provided diesel engine, comprising: a cylinder body; an intake air pipe coupled to an inlet end of the cylinder body and configured to convey gas to the cylinder body; an exhaust pipe coupled to an outlet end of the cylinder body and configured to emit exhaust gas from combustion in the cylinder body; a fuel ejection system coupled to the cylinder and configured to eject fuel into the cylinder body; an air system; and a control unit. According to the embodiments of the present invention, the air system comprises: an exhaust gas recirculation system coupled to the exhaust pipe and the intake air pipe and configured to convey a part of the exhaust gas from the incoming exhaust pipe back to the cylinder body via the intake air pipe; and a turbocharging system coupled to the exhaust pipe and configured to supercharge the intake gas pressure of the cylinder using the exhaust gas from the exhaust pipe. The control unit comprises the apparatus as above mentioned for controlling the air system in a steady state.

According to another aspect of the present invention, there is provided a method for controlling an air system of a diesel engine in a steady state, wherein the air system comprises an exhaust gas recirculation system and a turbocharging system. The method comprises: acquiring a parameter indicating an actual working condition of the diesel engine; computing a decoupling transfer function based on the parameter and a transfer function characterizing the diesel engine, wherein the transfer function is calibrated based on working condition data of the diesel engine in its steady working area; processing a parameter indicating a state of the air system; and generating a first driving signal for the exhaust gas recirculation system and a second driving signal for the turbocharing system based on the decoupling transfer function and a result of the processing.

According to the embodiments of the present invention, there is provided an apparatus and a method that can effectively control an air system of a diesel engine. In the embodiments of the present invention, the diesel engine is characterized by a transfer function. During the control process, a decoupling transfer function is computed based on the transfer function and a parameter indicating the working condition of the diesel engine, thereby guaranteeing that the driving signal for the EGR valve and the driving signal for the supercharging valve can be independently generated, thereby realizing decoupling therebetween. Specifically, decoupling between the two driving signals may be realized when the decoupling function acts on the processed air system state parameter (for example, the EGR flow ratio and intake air pressure of the engine), which will be detailed hereinafter.

In particular, those skilled in the art should understand that the diesel engine does not work steadily under all states of the air system. For example, the diesel engine generally can only work steadily under some combination of EGR valve and supercharging valve. According to the embodiments of the present invention, it will determine the combination of the opening degree of the EGR valve and the opening degree of supercharging valve, which enables the diesel engine to work steadily, i.e., the steady working area of the diesel engine, under a given rotating speed and load. In this way, the transfer function of the engine and the decoupling transfer function for controlling the air system may be calibrated using data in the steady working area (for example, data at the steady working equilibrium point as mentioned infra) In this way, the embodiments according to the present invention guarantee that the exhaust gas recirculation valve and the turbocharging valve are controlled independently in a steady state working condition and may be calibrated respectively. Therefore, it not only achieves the simplicity of calibrating the two systems, but also significantly improves the functionality of the air control system.

BRIEF DESCRIPTION OF THE DRAWINGS

Through reading the following detailed description with reference to the accompanying drawings, the above and other objectives, features and advantages of the embodiments of the present invention will become more comprehensible. In the drawings, a plurality of embodiments of the present invention will be illustrated in an exemplary and non-limiting manner, wherein.

In the drawings, same or corresponding reference signs indicate the same or corresponding parts.

DETAILED DESCRIPTION OF THE EMBODIMENTS

Hereinafter, the principle and spirit of the present invention will be described with reference to various exemplary embodiments. It should be understood that these embodiments are provided only to enable those skilled in the art to better understand and then implement the present invention, not to limit the present invention in any manner.

According to the embodiments of the present invention, there is provided an apparatus and a method for controlling an air system of a diesel engine. It should be noted that the term "air system" used herein at least comprises an exhaust gas recirculation EGR system and a turbocharging system. It should also be noted that specific turbocharging systems such as a variable geometry turbocharging system (VGT) as mentioned herein are only for explanation and illustration purposes. The embodiments of the present invention are likewise suitable for any existing or future developed turbocharging system that works utilizing engine exhaust gas. The scope of the present invention is not limited thereto.

Additionally, the term "parameter" used herein represents a value of any physical quantity that can indicate a (target or actual) physical state or operation condition of the engine. Moreover, in the context of this specification, a "parameter" may be used interchangeably with the physical quantity represented thereby. For example, "a parameter indicating rotating speed" has an equivalent meaning herein with "rotating speed."

Besides, in this specification, the term "acquisition" includes various of currently existing or future developed means, for example, measure, read, estimate, evaluate, and the like.

Hereinafter, the principle and spirit of the present invention will be described in detail with reference to a plurality of representative embodiments of the present invention. First, refer to FIG. 1, as above mentioned, which shows a schematic structural diagram of a diesel engine 100 equipped with an exhaust gas recirculation system and a turbocharging system. It should be understood that FIG. 1 merely shows those parts in the diesel engine 100 which are relevant to the embodiments of the present invention. The diesel engine 100 may further comprise any number of other components.

Figure 1:
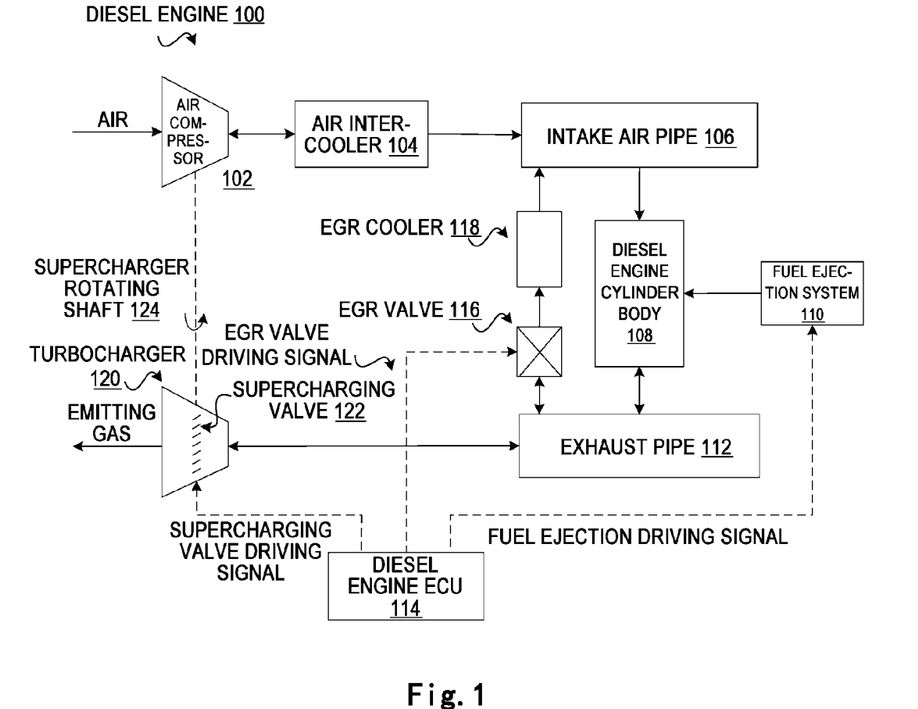
FIG. 1 shows a schematic structural diagram of a diesel engine comprising an exhaust gas recirculation system and a turbocharging system.

As shown in FIG. 1, the diesel engine 100 comprises: a cylinder body 108; an intake air pipe 106 coupled to an inlet end of the cylinder body 108 and configured to convey gas to the cylinder body 108; an exhaust pipe 112 coupled to an outlet end of the cylinder body 108 and configured to emit exhaust gas from combustion in the cylinder body 108; a fuel ejection system 110 coupled to the cylinder body 108 and configured to eject fuel into the cylinder body 108; an air system; and a control unit (ECU) 1 for controlling the diesel engine 100. As above mentioned, the air system comprises: an exhaust gas recirculation system (for example, comprising an ERG valve 116, an ERG cooler 118, and other essential components) coupled to the exhaust pipe 112 and the intake air pipe 106, configured to convey a part of the exhaust gas from the exhaust pipe 112 back to the cylinder 108 via the intake air pipe 106; and a turbocharging system (for example, comprising a supercharger 120, a supercharger rotating shaft 124, an air compressor 102, an air intercooler 104, and other essential components) coupled to the exhaust pipe 112, configured to supercharge the intake air pressure through the cylinder body 108 using the exhaust gas from the exhaust pipe 112.

FIG. 1 shows that both the exhaust gas recirculation system and the turbocharging system receive the exhaust gas from the exhaust pipe 112, and their intake air flows are controlled by the EGR valve 116 and a supercharging valve 122, respectively. During the operation, a diesel engine electronic control unit (ECU) 1 generates corresponding valve driving signals, based on the working condition of the engine, for controlling the opening degree of the EGR valve 116 and the opening degree of the supercharging valve 122, respectively. As above mentioned, the performances of the exhaust gas recirculation system and the turbocharging system influence each other; therefore, it is desirable for performing effective control of the opening degree of the exhaust gas recirculation valve 116 and the opening degree of the supercharging valve 122.

Figure 2:
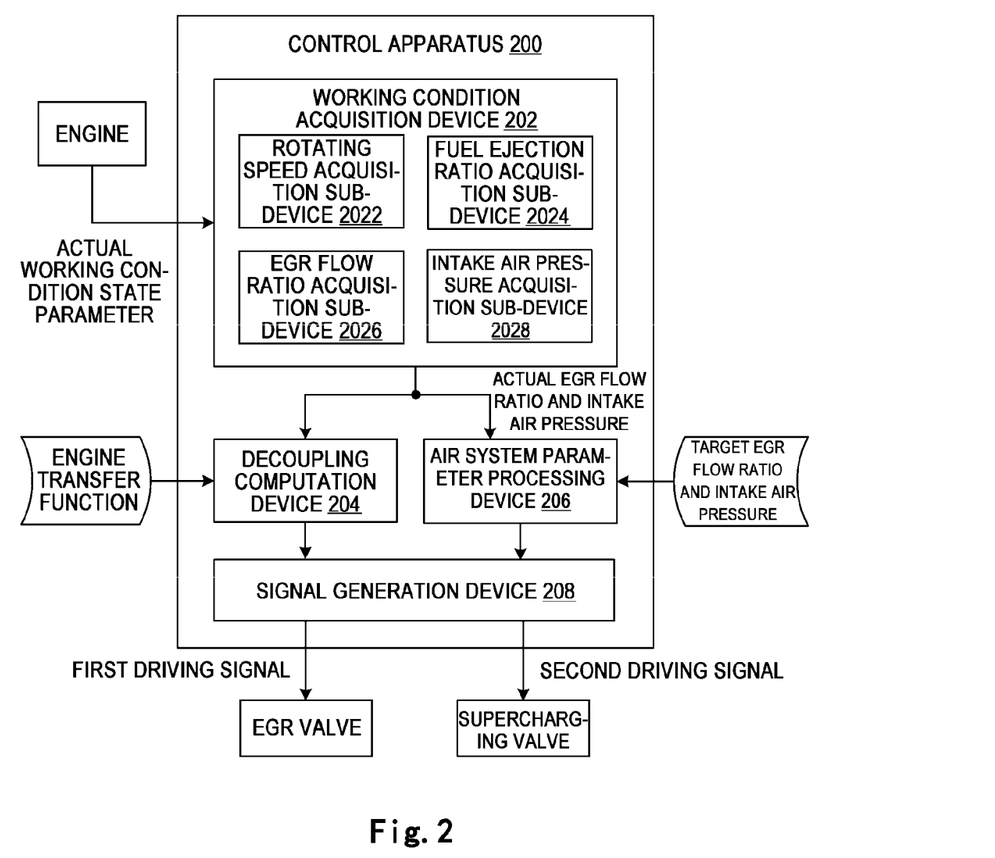
FIG. 2 shows a schematic structural diagram of a control apparatus 200 for an air system of the diesel engine according to the embodiments of the present invention.

Refer to FIG. 2, which shows a schematic structural diagram of a control apparatus 200 for an air system of a diesel engine according to the embodiments of the present invention. It should be understood that the control apparatus 200 may be implemented as the diesel engine ECU 114 as shown in FIG. 1 or a part thereof. Alternatively, the control apparatus 200 may also be implemented as a control device specific for an air system of a diesel engine.

As shown in FIG. 2, the control apparatus 200 comprises a working condition acquisition device 202 configured to acquire a parameter indicating an actual working condition of a diesel engine (for example, the diesel engine 100 of FIG. 1). In some embodiments of the present invention, the working condition acquisition device 202 may comprise a rotating speed acquisition sub-device 2022 configured to acquire a parameter indicating an actual rotating speed of the engine, denoted as w. The working condition acquisition device 202 may further comprise a fuel ejection ratio acquisition sub-device 2024 configured to acquire a parameter indicating an actual fuel ejection ratio of the engine, denoted as $\dot{m}_f$. Besides, according to the embodiments of the present invention, the working condition acquisition device 202 further comprises an EGR flow ratio acquisition sub-device 2026 and an intake air pressure acquisition sub-device 2028, which will be depicted in detail infra.

It should be understood that the working condition acquisition device (as well as the sub-devices 2022-2028 included therein) may acquire the working condition parameters of the engine through actual measurement, and the working condition acquisition device 202 may also acquire the working condition parameter of the engine through estimation or evaluation based on actual conditions, and so on. The scope of the present invention is not limited thereto. Moreover, it should also be understood that sub-devices 2022-2028 are merely examples of sub-devices that may be included in the working condition acquisition device 202. Actually, the working condition acquisition device 202 may comprise any one or more other acquisition sub-devices for acquiring other working condition parameters of the diesel engine. It would be readily contemplated by those skilled in the art, and the scope of the present invention is likewise not limited thereto.

As shown in FIG. 2, according to the embodiments of the present invention, the control apparatus 200 further comprises a decoupling computation device 204 coupled to the working condition acquisition device 202 and configured to compute a decoupling transfer function based on parameters (such as the engine rotating speed ω and the engine fuel ejection ratio $\dot{m}_f$) from the working condition acquisition device 202 and a transfer function characterizing the engine. Hereinafter, the features and operations of the decoupling computation device 204 will be depicted in detail with reference to specific examples.

Those skilled in the art would understand that the features of the engine in certain aspects may be characterized by a transfer function. The transfer function may be a polynomial of engine state variables, MAP graph data, and the like. In particular, as above mentioned, one of main objectives of the embodiments of the present invention is: to control the opening degree of the EGR valve of the exhaust gas recirculation system and the supercharge valve of the turbocharging system, respectively. The opening degree of the EGR valve and supercharging valve in turn influences the EGR flow ratio (denoted as $\dot{m}_{EGR}$) and intake air pressure (denoted as $P_{im}$) of the diesel engine, both of which indicate the states of the air system. Therefore, in the embodiments of the present invention, the transfer signal (denoted as W) may be designed to character the influence of the opening degree of the EGR valve and the supercharging valve on the EGR flow ratio ($\dot{m}_{EGR}$) and intake air pressure ($P_{im}$) of the diesel engine.

Those skilled in the art may understand that the transfer function of the diesel engine may be calibrated using working condition parameters of the engine. However, it is not the case that the diesel engine can work steadily in all state parameters of the air system. Actually, the diesel engine generally can only work steadily under some combinations of the EGR valve and the supercharging valve. Calibration of the transfer function using the working condition parameters of the engine in an unsteady state might cause the transfer function unable to accurately reflect the feature of the engine, such that a decoupling transfer function derived based on such transfer function cannot effectively decouple the control of the EGR system and the supercharging system.

Thus, in the embodiments of the present invention, in order to calibrate the transfer function more accurately, a steady working area of the diesel engine will be determined first. The term "steady working area" as used herein refers to a scope of air system state parameters under which the diesel engine may be caused in a steady working state. In particular, in some embodiments of the present invention, the steady working area may represent a scope of the opening degree of the EGR valve and the opening degree of the supercharging valve which enables the diesel engine to work steadily under a given rotating speed and load.

Figure 3:
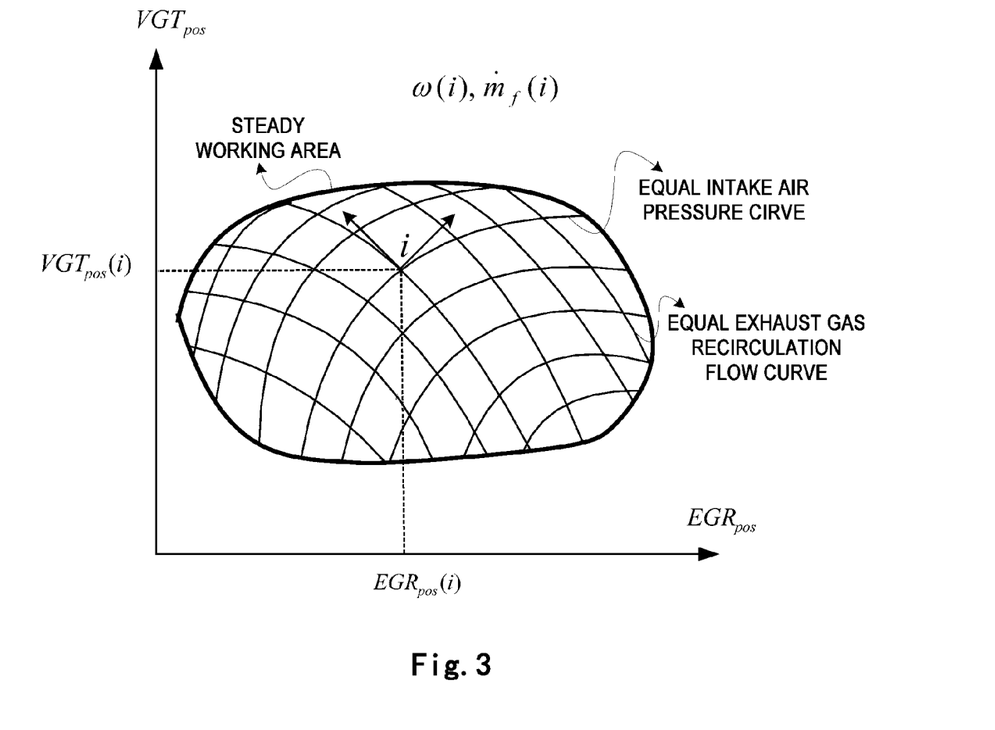
FIG. 3 shows a diagram of a steady operation state of the diesel engine according to the embodiments of the present invention.

For example, refer to FIG. 3, which shows a steady working area (shown in bold contour line) of a diesel engine under various working conditions (i.e., the rotating speed ω of the engine, the fuel ejection ratio $\dot{m}_f$, the opening degree of the EGR valve $EGR_{POS}$, and the opening degree of the supercharging valve $VGT_{POS}$). As shown in the figure, the horizontal ordinate in the coordinate system as shown denotes the opening degree of the EGR valve ($EGR_{POS}$), and the vertical coordinate denotes the opening degree of the supercharging valve ($VGT_{POS}$). In the scope of the steady working area as shown in FIG. 3, the diesel engine may work steadily. According to the embodiments of the present invention, this steady working area may be determined based on priori knowledge, existing specifications, a product manual, a diesel engine experiment and/or simulation, and various other means. Other manners of determining a steady working area of the engine are also feasible, and the scope of the present invention is not limited thereto.

According to the embodiments of the present invention, the feature function of the diesel engine may be calibrated based on the working condition data of the engine in its steady working area. In particular, according to some embodiments of the present invention, the working condition data in the steady working area may be the working condition data of the diesel engine in its steady state working condition equilibrium point. The term "steady state working condition equilibrium point" used herein indicates that when the state parameters of the air system (for example, the opening degree of the EGR valve and of the supercharging valve) are located at this point, relevant physical parameters of the diesel engine are all in a steady equilibrium state. For example, with the intake air pressure of the engine cylinder body ($P_{im}$) and EGR flow ratio ($\dot{m}_{egr}$) as independent variables of the transfer function, at the steady working condition equilibrium point, the intake air pressure and the EGR flow ratio of the diesel engine are both in a steady equilibrium state.

Now, one exemplary embodiment for determining the steady state working condition equilibrium point of the diesel engine will be depicted. Still refer to FIG. 3, in the steady working area of the diesel engine, an equal intake air pressure curve and an equal exhaust gas recirculation flow curve of the diesel engine may be built. It would be appreciated that in the steady working area, for each given rotating speed and load, a plurality of pairs of the opening degree of EGR valve and the opening degree of supercharging valve may be determined, which may keep the cylinder intake air pressure of the engine constant. Each of those pairs corresponds to a point in the coordinate system. Based on these points, a curve may be built by curve fitting or approximation. At each point of the curve, the cylinder intake air pressure of the engine keeps constant. Therefore, this curve is called "equal intake air pressure curve." For multiple given working conditions of the engine, a plurality of such equal intake air pressure curves may be built. Similarly, an equal exhaust gas recirculation flow curve of the engine may be likewise built.

As shown in FIG. 3, in the steady working area of the diesel engine, a series of intersection points exist between the equal intake air pressure curves and the equal exhaust gas recirculation flow curves. At these intersection points, both the cylinder intake air pressure and the exhaust gas recirculation amount of the diesel engine are both in a steady state. Therefore, the opening degree of the supercharging valve opening and the opening degree of the EGR valve opening corresponding to these intersection points may be determined as the steady state working condition equilibrium points of the diesel engine.

Now, it will be discussed how to leverage the working condition data of the diesel engine at its steady working condition equilibrium point to calibrate the transfer function characterizing the diesel engine. According to the embodiments of the present invention, the exhaust gas recirculation flow ratio $\dot{m}_f$ and the cylinder intake air pressure $P_{im}$ of the diesel engine at each steady working state in the steady working area are indicated by the following equation (1) and equation (2):

$$\dot{m}_{egr} = F_{egr}(\omega, \dot{m}_f, EGR_{POS}, VGT_{pos}) \quad (1)$$

$$P_{im} = F_p(\omega, \dot{m}_f, EGR_{pos}, VGT_{pos}) \quad (2)$$

At each steady state working condition equilibrium point of the diesel engine, linearization processing is performed to equations (1) and (2). The results after the linearization processing are expressed in the form of increments as follows:

$$\Delta \dot{m}_{egr} = \quad (3)$$
$$\frac{\partial F_{egr}}{\partial \dot{m}_f} \Delta \dot{m}_f + \frac{\partial F_{egr}}{\partial \omega} \Delta \omega + \frac{\partial F_{egr}}{\partial EGR_{pos}} \Delta EGR_{pos} + \frac{\partial F_{egr}}{\partial VGT_{pos}} \Delta VGT_{pos}$$

$$\Delta P_{im} = \quad (4)$$
$$\frac{\partial F_p}{\partial \dot{m}_f} \Delta \dot{m}_f + \frac{\partial F_p}{\partial \omega} \Delta \omega + \frac{\partial F_p}{\partial EGR_{pos}} \Delta EGR_{pos} + \frac{\partial F_p}{\partial VGT_{pos}} \Delta VGT_{pos}$$

Thereby, it may be derived that $$\begin{Bmatrix} \Delta \dot{m}_{egr} \\ \Delta P_{im} \\ \Delta \dot{m}_f \\ \Delta \omega \end{Bmatrix} = \begin{bmatrix} \frac{\partial F_{egr}}{\partial EGR_{pos}} & \frac{\partial F_{egr}}{\partial VGT_{pos}} & \frac{\partial F_{egr}}{\partial \dot{m}_f} & \frac{\partial F_{egr}}{\partial \omega} \\ \frac{\partial F_p}{\partial EGR_{pos}} & \frac{\partial F_p}{\partial VGT_{pos}} & \frac{\partial F_p}{\partial \dot{m}_f} & \frac{\partial F_p}{\partial \omega} \\ 0 & 0 & 1 & 0 \\ 0 & 0 & 0 & 1 \end{bmatrix} \begin{Bmatrix} \Delta EGR_{pos} \\ \Delta VGT_{pos} \\ \Delta \dot{m}_f \\ \Delta \omega \end{Bmatrix} \quad (5)$$

Based on equation (5), those skilled in the art would appreciate that at a steady state working condition of the diesel engine, its transfer function W may be expressed as:

$$W(\omega, \dot{m}_f, EGR_{pos}, VGT_{pos}) = \quad (6)$$
$$\begin{bmatrix} \frac{\partial F_{egr}}{\partial EGR_{pos}} & \frac{\partial F_{egr}}{\partial VGT_{pos}} & \frac{\partial F_{egr}}{\partial \dot{m}_f} & \frac{\partial F_{egr}}{\partial \omega} \\ \frac{\partial F_p}{\partial EGR_{pos}} & \frac{\partial F_p}{\partial VGT_{pos}} & \frac{\partial F_p}{\partial \dot{m}_f} & \frac{\partial F_p}{\partial \omega} \\ 0 & 0 & 1 & 0 \\ 0 & 0 & 0 & 1 \end{bmatrix}$$

In the above equation (6), various items $$\frac{\partial F_{egr}}{\partial EGR_{pos}}, \frac{\partial F_{egr}}{\partial VGT_{pos}}, \frac{\partial F_{egr}}{\partial \dot{m}_f} \text{ and } \frac{\partial F_{egr}}{\partial \dot{m}_f}$$

in the matrix may be calibrated by leveraging the working condition datum of the diesel engine at each steady state working condition equilibrium point thereof ($\omega^*, \dot{m}^*_f, EGR^*_{pos}, VGT^*_{pos}$). Such working condition datum, for example, may be acquired through an experiment and/or a simulation of the diesel engine. In particular, according to some embodiments of the present invention, the matrix items $$\frac{\partial F_{egr}}{\partial EGR_{pos}}, \frac{\partial F_{egr}}{\partial VGT_{pos}}, \frac{\partial F_{egr}}{\partial \dot{m}_f} \text{ and } \frac{\partial F_{egr}}{\partial \dot{m}_f}$$

may be polynomial or graph of the engine state variables $\omega^*, \dot{m}_f, EGR^*_{pos}, VGT^*_{pos}$.

By far, in the embodiments of the present invention, calibration of the engine transfer function of the diesel engine is accomplished by leveraging the working condition data of the engine in its steady working area (in particular, the working condition data at the steady working condition equilibrium points). Hereinafter, consider the decoupling transfer function (denoted as G) to be computed by the decoupling computation device 204. Similar to the transfer function W, the decoupling transfer function G likewise takes the rotating speed $\omega$ and the fuel ejection ratio $\dot{m}_f$ of the engine as independent variables and may be defined below:

$$G(\omega, \dot{m}_f, EGR_{pos}, VGT_{pos}) = \begin{bmatrix} G_{11} & G_{12} & G_{13} & G_{14} \\ G_{21} & G_{22} & G_{23} & G_{24} \\ 0 & 0 & 1 & 0 \\ 0 & 0 & 0 & 1 \end{bmatrix} \quad (7)$$

In one embodiment of the present invention, in order to match the actual working condition of the engine with the theoretical expectation to the utmost, suppose the decoupling computation device 204 may configure an inverse of the steady state transfer function W of the engine as the steady state decoupling transfer function G. Namely:

$$G(\omega, \dot{m}_f, EGR_{pos}, VGT_{pos}) = W(\omega, \dot{m}_f, EGR_{pos}, VGT_{pos})^{-1} \quad (8)$$

Based on equations (6)-(8), various items of the decoupling transfer function G may be derived:

$$G_{11} = \frac{\frac{\partial F_p}{\partial VGT_{pos}}}{\frac{\partial F_{egr}}{\partial EGR_{pos}}\frac{\partial F_p}{\partial VGT_{pos}} - \frac{\partial F_{egr}}{\partial VGT_{pos}}\frac{\partial F_p}{\partial EGR_{pos}}}$$

$$G_{12} = \frac{-\frac{\partial F_{egr}}{\partial VGT_{pos}}}{\frac{\partial F_{egr}}{\partial EGR_{pos}}\frac{\partial F_p}{\partial VGT_{pos}} - \frac{\partial F_{egr}}{\partial VGT_{pos}}\frac{\partial F_p}{\partial EGR_{pos}}}$$

$$G_{13} = \frac{\frac{\partial F_{egr}}{\partial VGT_{pos}}\frac{\partial F_p}{\partial \dot{m}_f} - \frac{\partial F_{egr}}{\partial \dot{m}_f}\frac{\partial F_p}{\partial VGT_{pos}}}{\frac{\partial F_{egr}}{\partial EGR_{pos}}\frac{\partial F_p}{\partial VGT_{pos}} - \frac{\partial F_{egr}}{\partial VGT_{pos}}\frac{\partial F_p}{\partial EGR_{pos}}}$$

$$G_{14} = \frac{\frac{\partial F_{egr}}{\partial VGT_{pos}}\frac{\partial F_p}{\partial \omega} - \frac{\partial F_{egr}}{\partial \omega}\frac{\partial F_p}{\partial VGT_{pos}}}{\frac{\partial F_{egr}}{\partial EGR_{pos}}\frac{\partial F_p}{\partial VGT_{pos}} - \frac{\partial F_{egr}}{\partial VGT_{pos}}\frac{\partial F_p}{\partial EGR_{pos}}}$$

$$G_{21} = \frac{-\frac{\partial F_p}{\partial EGR_{pos}}}{\frac{\partial F_{egr}}{\partial EGR_{pos}}\frac{\partial F_p}{\partial VGT_{pos}} - \frac{\partial F_{egr}}{\partial VGT_{pos}}\frac{\partial F_p}{\partial EGR_{pos}}}$$

$$G_{22} = \frac{\frac{\partial F_{egr}}{\partial EGR_{pos}}}{\frac{\partial F_{egr}}{\partial EGR_{pos}}\frac{\partial F_p}{\partial VGT_{pos}} - \frac{\partial F_{egr}}{\partial VGT_{pos}}\frac{\partial F_p}{\partial EGR_{pos}}}$$

$$G_{23} = \frac{\frac{\partial F_{egr}}{\partial \dot{m}_f}\frac{\partial F_p}{\partial EGR_{pos}} - \frac{\partial F_{egr}}{\partial EGR_{pos}}\frac{\partial F_p}{\partial \dot{m}_f}}{\frac{\partial F_{egr}}{\partial EGR_{pos}}\frac{\partial F_p}{\partial VGT_{pos}} - \frac{\partial F_{egr}}{\partial VGT_{pos}}\frac{\partial F_p}{\partial EGR_{pos}}}$$

$$G_{24} = \frac{\frac{\partial F_{egr}}{\partial \omega}\frac{\partial F_p}{\partial EGR_{pos}} - \frac{\partial F_{egr}}{\partial EGR_{pos}}\frac{\partial F_p}{\partial \omega}}{\frac{\partial F_{egr}}{\partial EGR_{pos}}\frac{\partial F_p}{\partial VGT_{pos}} - \frac{\partial F_{egr}}{\partial VGT_{pos}}\frac{\partial F_p}{\partial EGR_{pos}}}$$

By far, the decoupling transfer function G may be computed by leveraging the transfer function W calibrated based on the working condition data of the engine in its steady working area. As detailed infra, by acting the decoupling transfer function G on corresponding physical parameters, driving signals for the EGR system and the turbocharging system may be generated independently, thereby effectively implementing the decoupling control between the two.

It should be noted that what are depicted above are only several exemplary embodiments of the present invention. For example, the features of the engine are not limited to being characterized only by the rotating speed and the fuel ejection ratio. It is obvious to those skilled in the art that the transfer function W and the decoupling transfer function G may consider any relevant working conditions of the engine (namely, as independent variables). For another example, it is only a preferred embodiment to compute the decoupling transfer function G as the inverse of the engine transfer function W. Those skilled in the art may compute the decoupling transfer function G based on the transfer function W and the working condition parameters in other different manners with reference to actual conditions. The scope of the present invention is not limited thereto.

Continue referring to FIG. 2, according to the embodiments of the present invention, the control apparatus 200 may further comprise an air system parameter processing device 206 coupled to the working condition acquisition device 202 and configured to process a parameter indicating the state of the air system of the diesel engine.

In particular, in some embodiments of the present invention, the state parameters of the air system may include: EGR flow ratio and intake air pressure of the diesel engine. Correspondingly, in these embodiments, as mentioned above, the working condition acquisition device 202 may comprise an EGR flow ratio acquisition sub-device 2026 configured to acquire a parameter indicating an actual EGR flow ratio of the engine (denoted as $\dot{m}_{egr,act}$); and an intake air pressure acquisition sub-device 2028 configured to acquire a parameter indicating actual intake air pressure of the engine (denoted as $P_{im,act}$). The working condition acquisition device 202 may provide the acquired actual EGR flow ratio and actual intake air pressure to the air system parameter processing device 206, as shown in FIG. 2.

Besides, as shown in FIG. 2, the air system parameter processing device 206 may further be configured to receive a target EGR flow ratio (denoted as $\dot{m}_{egr,des}$) and a target intake air pressure (denoted as $P_{im,des}$) of the diesel engine. For example, in some embodiments of the present invention, $\dot{m}_{egr,act}$ and $P_{im,act}$ may be pre-calibrated and may be pre-stored in a memory or database accessible by the control device 200.

Given the actual values $\dot{m}_{egr,act}$ and $P_{im,act}$, and the target values $\dot{m}_{egr,des}$ and $P_{im,des}$, the air system parameter processing device 206 may be configured to perform essential processing to the generation of the driving signals. For example, according to some embodiments of the present invention, the air system parameter processing device 206 may comprise: a sub-device configured to determine an error (denoted as $e_m$) between the actual EGR flow ratio $\dot{m}_{egr,act}$ and the target EGR flow ratio $\dot{m}_{egr,des}$. The air system parameter processing device 206 may further comprise: a sub-device configured to determine an error (denoted as $e_P$) between the actual intake air pressure $P_{im,act}$ and the target intake air pressure $P_{im,des}$. Besides, the air system parameter processing device 206 may further comprise: sub-devices configured to perform PID processing to the errors $e_m$ and $e_P$, respectively, and results derived from the processing will be used by the signal generating device 208 (which will be detailed infra) to generate control signals. The above sub-devices included in the air system parameter processing device 206 and their operations are well-known in the art and thus are not shown in the figure, which will not be detailed here any more.

It should be understood that the above depicted EGR flow ratio, intake air pressure, and PID processing are only exemplary. Actually, the air system parameter processing device 206 may be configured to perform any existing or future developed appropriate processing to the state parameters of the air system.

Continue referring to FIG. 2, the control apparatus 20 further comprises a signal generating device 208 coupled to the decoupling computation device 204 and the air system parameter processing device 206 and configured to generate a first driving signal for the EGR system and a second driving signal for the tubocharging system, respectively, based on the decoupling transfer function G from the decoupling computation device 204 and the processing result from the air system parameter processing device 206.

Figure 4:
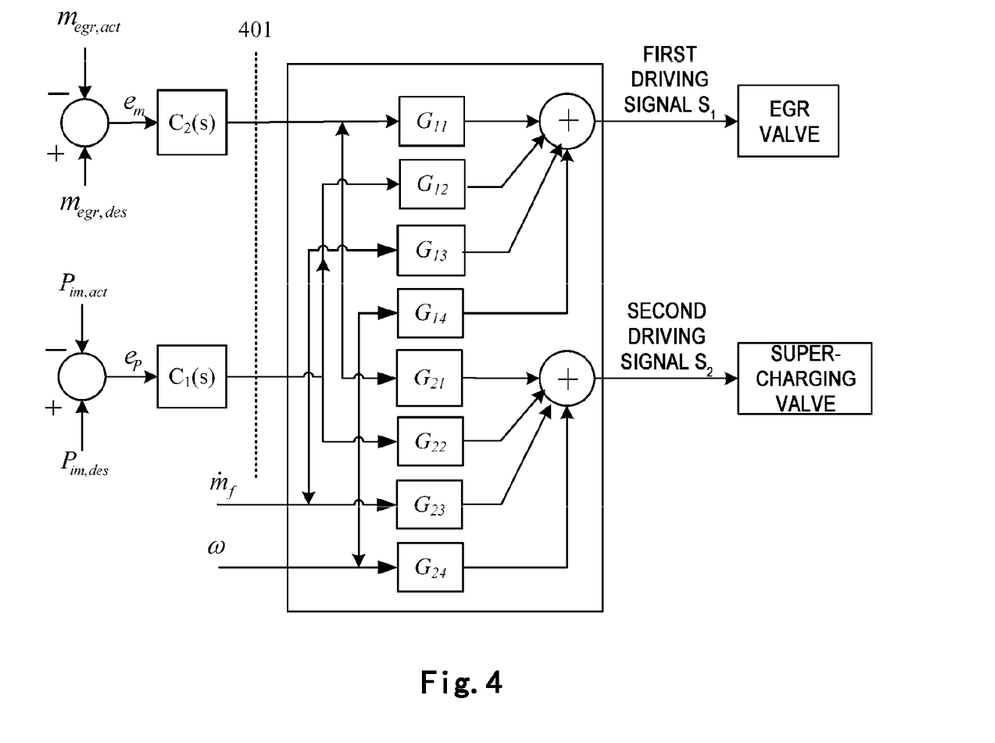
FIG. 4 shows a schematic diagram of independently generating two classes of driving signals using a decoupling transfer function according to the embodiments of the present invention.

Refer to FIG. 4, which shows a diagram of an exemplary operation mechanism of the signal generating device 208. In the example of FIG. 4, like what is depicted above, the transfer function W and the decoupling transfer function G still take the rotating speed and the fuel ejection ratio of the diesel engine as independent variables. Moreover, the state parameters of the air system are the EGR flow ratio and the intake air pressure.

In FIG. 4, the part at the left side of the dotted line 401 may represent the operation of the air system parameter processing device 206, namely, performing essential processing to the actual EGR flow ratio $\dot{m}_{egr,act}$, the target EGR flow ratio $\dot{m}_{egr,des}$, the actual intake air pressure $P_{im,act}$, and the target intake air pressure $P_{im,des}$ of the diesel engine. As indicated above, according to the embodiments of the present invention, the operation may comprise determining the EGR flow ratio error $e_m$ and the intake air pressure error $e_p$, and the $e_m$ and the $e_p$ are fed to an independent controller $C_1$ for EGR and an independent controller $C_2$ for VGT. According to some embodiments, the controllers $C_1$ and $C_2$ may perform PID processing to the $e_m$ and the $e_p$.

Respective items $G_{11}$, $G_{12}$, $G_{13}$, $G_{14}$, $G_{21}$, $G_{22}$, $G_{23}$ and $G_{24}$ may be computed by the decoupling computation device 204 as indicated above and provided to the signal generating device 208. Therefore, the control signals $S_1$ for the EGR valve and $S_2$ for the supercharging valve may be expressed below, respectively:

$$S_1 = G_{11}C_1(s) \pm G_{12}C_2(s) + G_{13}\dot{m}_f + G_{14}\omega \quad (9)$$

$$S_2 = G_{21}C_1(s) + G_{22}C_2(S) + G_{23}\dot{m}_f + G_{24}\omega \quad (10)$$

The $C_1(s)$ and $C_2(s)$ represent the processing results for the error signals $e_m$ and $e_p$ by the controllers $C_1$ and $C_2$, respectively. For example, in the embodiment in which the controllers perform PID to the error signals, $C_1(s) = PID(e_m)$ and $C_2(s) = PID(e_p)$. The first control signal $S_1$ and the second control signal $S_2$ derived therefrom may be used to control the EGR system and the supercharging system, respectively, for example, controlling the opening degree of the EGR valve and the opening degree of the supercharging valve.

It may be understood that FIG. 4 merely shows an exemplary operation mechanism of the signal generating device 208. In other embodiments, the signal generating device 208 may be configured to have the decoupling transfer function G act on relevant parameters such as EGR flow ratio and the intake air pressure in different manners, thereby generating driving signals in a decoupling manner.

The structure and operation of the control apparatus 200 according to the present invention have been described with reference to several specific embodiments. It should be understood through the above description that according to the embodiments of the present invention, the control apparatus 200 may generate driving signals for the EGR valve and the supercharging valve in a mutually independent manner, respectively, so as to effectively decouple the exhaust gas recirculation system and the turbocharing system in a steady state, thereby improving the control of the air system of the diesel engine.

It should be understood that the control apparatus 200 as illustrated in FIG. 2 and described above may be implemented in various manners. For example, in some embodiments, the apparatus 200 may be implemented as an integrated circuit (IC) chip or an application-specific integrated circuit (ASIC). In some other embodiments, the apparatus 200 may be implemented through a system on chip (SoC) and corresponding software and/or firmware. Alternatively or additionally, the apparatus 200 may also be implemented by software modules, i.e., implemented as a computer program product. The scope of the present invention is not limited thereto.

Figure 5:
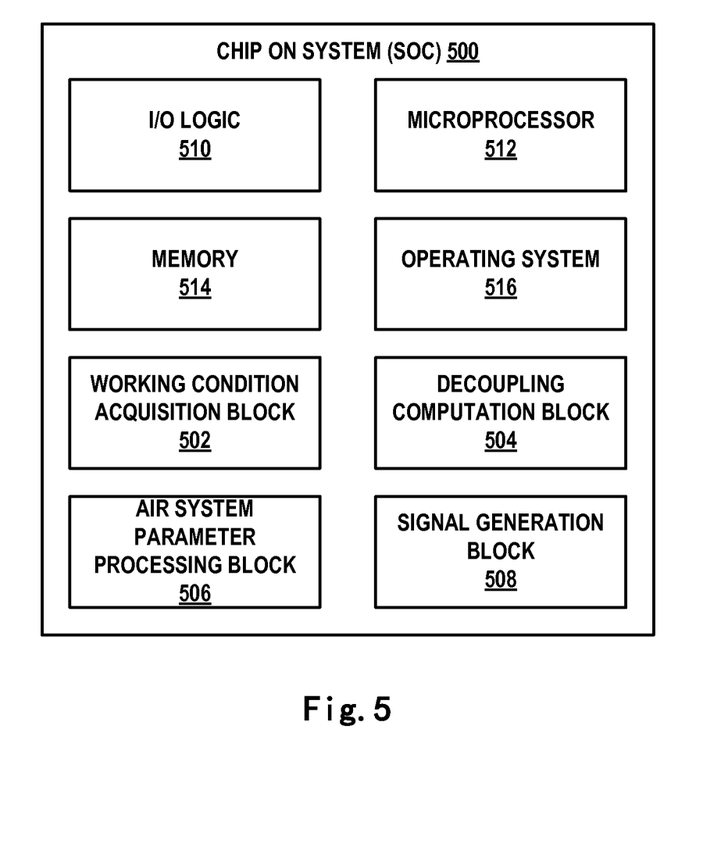
FIG. 5 shows a schematic structural diagram of a system-on-chip (SoC) 500 suitable for implementing the control apparatus 200 in FIG. 2.

Refer to FIG. 5, which illustrates a structural block diagram of a system on chip (SoC) 500 suitable for implementing the control apparatus 200 as shown in FIG. 2. As shown in FIG. 5, the SoC 4 comprises various components, such as an input/output (I/O) logic 510 (for example for including an electronic circuit) and a microprocessor 512 (for example, any micro controller or digital signal processor). The SoC 500 further comprises a memory 514, which may be any type of random access memory (RAM), a low delay non-volatile memory (for example, flash memory), a read-only memory (ROM) and/or any other appropriate electronic data storage. The SoC 500 may further comprise various kinds of firmware and/or software, such as an operating system 516, which may be computer-executable instructions maintained by the memory 514 and executed by the microprocessor 512. The SoC 500 may further comprise various kinds of other communication interfaces and components, network interface components, other hardware, firmware, and/or software.

In particular, as shown in the figure, the SoC 500 may comprise a working condition acquisition block 502, a decoupling computation block 504, an air system parameter processing block 506, and a signal generation block 508, which correspond to the working condition acquisition device 202, the decoupling computation device 204, the air system parameter processing device 206, and the signal generating device 208 as described above with reference to FIG. 2, respectively. Besides, although not shown in FIG. 4, according to the embodiments of the present invention, the working condition acquisition block 502 may comprise sub-blocks corresponding to sub-devices 2022-2028 in FIG. 2, respectively. Those blocks 502-508 and their sub-blocks may operate as hardware, software and/or firmware modules independently or integrated with other entities such as a signal processing and control circuit, for implementing various embodiments and/or features as described herein.

It should be understood that according to the embodiments of the present invention, the SoC 500 may be integrated with an electronic circuit, a microprocessor, a memory, an input/output (I/O) logic, a communication interface and component, other hardware, firmware and/or software which is essential for running the whole apparatus. The SoC 500 may further comprise an integrated data bus (not shown) that couples various components of the SoC so as to be used for data communication between components. The apparatus including SoC 500 may be implemented using multiple combinations of different components.

Figure 6:
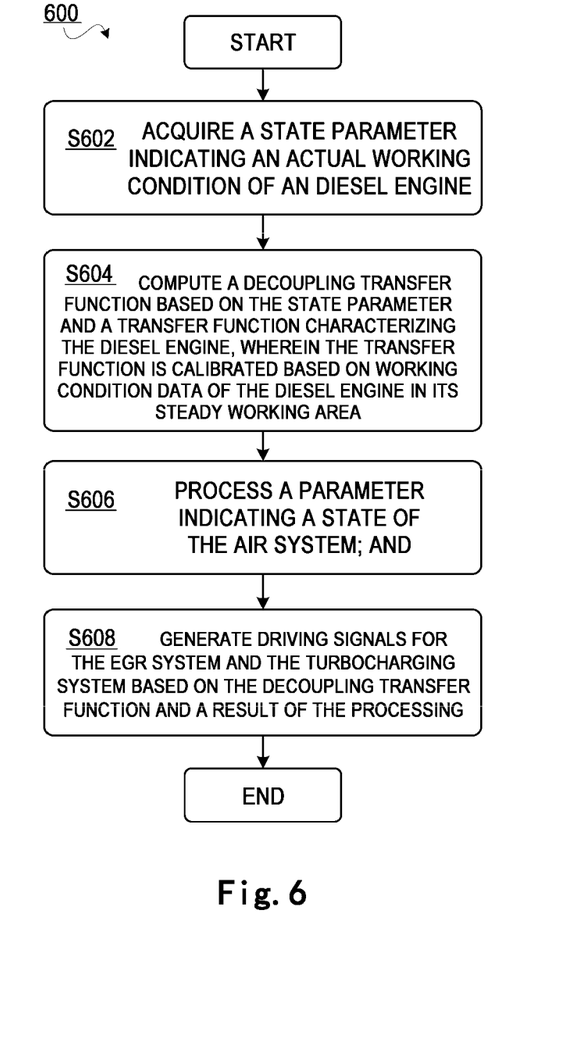
FIG. 6 shows a flow chart of a control method 600 for the air system of the diesel engine according to the embodiments of the present invention.

Now, refer to FIG. 6, which shows a flow chart of a control method 600 for controlling an air system of a diesel engine according to the embodiments of the present invention. After the method 600 starts, at step S602, parameters indicating actual working conditions of a diesel engine are acquired, which parameters include, but not limited to: rotating speed and fuel ejection ratio of the diesel engine.

Next, at step S604, the decoupling transfer function (for example, the above decoupling transfer function G) is computed based on the parameter acquired in step S602 and the transfer function (for example the transfer function Was depicted above) characterizing the diesel engine, wherein the transfer function W is calibrated based on the working condition data of the diesel engine in its steady working area.

Then, at step S606, parameters indicating states of the air system of the diesel engine are processed. According to some embodiments of the present invention, the state parameters of the air system comprise EGR flow ratio and intake air pressure of the diesel engine. In such embodiments, as depicted above, the errors between the actual values and the target values of the EGR flow ratio and the intake air pressure may be determined, respectively, and a PID processing is performed to the errors for future use. Of course, other air system state parameters and their processing are also possible, and the present invention is not limited hereto.

Finally, at step S608, a first driving signal for the EGR system and a second driving signal for the turbocharging system are generated, respectively, based on the decoupling transfer function from step S604 and the processing result from step S606. The method 600 ends accordingly.

It may be understood that steps S602-S608 as depicted in method 600 correspond to the operations and/or functions of devices 202-208 in the control apparatus 200 as depicted above with reference to FIG. 2. Therefore, the features as depicted above with reference to respective devices of the control apparatus 200 are likewise suitable for the respective steps of the method 600. Moreover, respective steps as recited in method 600 may be implemented in different orders and/or in parallel.

Further, it should be understood that the method 600 as described with reference to FIG. 6 may be implemented via a computer program product. For example, the computer program product may comprise at least one computer-readable memory medium that has a computer-readable program code portion stored thereon. When the computer-readable code portion is executed by for example a processor, it is used to execute the steps of the method 600.

The spirit and principle of the present invention has been illustrated above with reference to a plurality of specific embodiments. According to the embodiments of the present invention, there is provided an apparatus and a method that can effectively control an air system of a diesel engine in a steady state. During the control process, a decoupling transfer function is computed based on the transfer function of the engine and the parameter indicating the working condition of the diesel engine. Based on the processing result of having the decoupling transfer function act on relevant parameters such as the EGR flow ratio of the engine and the intake air pressure, driving signals for the exhaust gas recirculation (EGR) system and the turbocharging system may be generated independently to each other. In particular, according to the embodiments of the present invention, the transfer function is calibrated based on the working condition data of the diesel engine in its steady working area. In this way, the embodiments of the present invention guarantee that the exhaust gas recirculation valve and the turbocharging valve are controlled independently in a steady state working condition and may be calibrated separately. Therefore, it not only achieves the simplicity of calibrating the two systems, but also significantly improves the functionality of the air control system.

It should be noted that, the embodiments of the present invention can be implemented in software, hardware or the combination thereof. The hardware part can be implemented by a special logic; the software part can be stored in a memory and executed by a proper instruction execution system such as a microprocessor or a design-specific hardware. The normally skilled in the art may understand that the above method and apparatus may be implemented with computer-executable instructions and/or in a processor controlled code, for example, such code is provided on a bearer medium such as a magnetic disk, CD, or DVD-ROM, or a programmable memory such as a read-only memory (firmware) or a data bearer such as an optical or electronic signal bearer. The apparatuses and their components in the present invention may be implemented by hardware circuitry, e.g., a very large scale integrated circuit or a gate array, a semiconductor such as logical chips or transistors, or a programmable hardware device such as a field-programmable gate array or a programmable logical device, or implemented by software executed by various kinds of processors, or implemented by combination (such as firmware) of the above hardware circuitry and software.

It should be noted that although a plurality of devices or sub-devices of the control apparatus have been mentioned in the above detailed depiction, such partitioning is merely non-compulsory. In actuality, according to the embodiments of the present invention, the features and functions of the above described two or more devices may be embodied in one device. In turn, the features and functions of the above described one device may be further embodied in more devices.

Besides, although operations of the present methods are described in a particular order in the drawings, it does not require or imply that these operations must be performed according to this particular sequence, or a desired outcome can only be achieved by performing all shown operations. On the contrary, the execution order for the steps as depicted in the flowcharts may be varied. Additionally or alternatively, some steps may be omitted, a plurality of steps may be merged into one step, or a step may be divided into a plurality of steps for execution.

Although the present invention has been depicted with reference to a plurality of specific embodiments, it should be understood that the present invention is not limited to the disclosed embodiments. On the contrary, the present invention intends to cover various modifications and equivalent arrangements included in the spirit and scope of the appended claims. The scope of the appended claims meets the broadest explanations and covers all such modifications and equivalent structures and functions.

What is claimed is:

1. An apparatus for controlling an air system of a diesel engine in a steady state, wherein the air system comprises an exhaust gas recirculation system and a turbocharging system, the apparatus comprises:
   a memory storing computer executable components; and
   a processor configured to execute the following computer executable components in the stored memory:
      a working condition acquisition device configured to acquire one or more parameters indicating an actual working condition of the diesel engine;
      a decoupling computation device coupled to the working condition acquisition device and to receive the one or more parameters from the working condition acquisition device, the decoupling computation device configured to determine a decoupling transfer function by computing a set of coefficients of the decoupling transfer function based on the one or more parameters and a transfer function characterizing the diesel engine, wherein the transfer function is calibrated based on working condition data of the diesel engine in a steady working area;
      an air system parameter processing device coupled to the working condition acquisition device and to receive the one or more parameters from the working condition acquisition device, the air system parameter processing device configured to process at least one parameter of the one or more parameters indicating the state of the air system to determine an input to the decoupling transfer function; and
      a signal generation device coupled to the decoupling computation device and the air system parameter processing device, the signal generation device to receive the decoupling transfer function from the decoupling computation device and to receive the input to the decoupling transfer function from the air system parameter processing device, the signal generation device configured to generate a first driving signal and a second driving signal according to the decoupling transfer function and the input to the decoupling transfer function, the first driving signal for controlling the exhaust gas recirculation system and the second driving signal for controlling the turbocharging system.

2. The apparatus according to claim 1, wherein the transfer function of the diesel engine is calibrated based on working condition data of the diesel engine at a steady state working condition equilibrium point in the steady working area, that includes at least one steady state working condition equilibrium points.

3. The apparatus according to claim 2, wherein the steady state working condition equilibrium point is an intersection point of an equal intake air pressure curve and an equal exhaust gas recirculation flow curve of the diesel engine in the steady working area.

4. The apparatus according to claim 1, wherein the transfer function includes independent variables including a rotating speed and a fuel ejection ratio of the diesel engine, and wherein the working condition acquisition device comprises:
a rotating speed acquisition device configured to acquire a parameter indicating the rotating speed of the diesel engine; and
a fuel ejection ratio device configured to acquire a parameter indicating the fuel ejection ratio of the diesel engine.

5. The apparatus according to claim 1, wherein the air system parameter processing device comprises:
a first sub-device configured to determine a first error between an actual exhaust gas recirculation flow ratio and a target exhaust gas recirculation flow ratio of the diesel engine;
a second sub-device configured to perform PID processing to the first error of the exhaust gas recirculation flow ratio;
a third sub-device configured to determine a second error between an actual intake air pressure and a target intake air pressure of the diesel engine; and
a fourth sub-device configured to perform PID processing to the second error of the intake air pressure.

6. The apparatus according to claim 5, wherein the working condition acquisition device comprises:
an exhaust gas recirculation flow ratio acquisition sub-device configured to acquire a parameter indicating the actual exhaust gas recirculation flow ratio of the diesel engine and to provide the parameter indicating the actual exhaust gas recirculation flow ratio to the air system parameter processing device; and
an intake air pressure acquisition device configured to acquire a parameter indicating actual intake air pressure of the diesel engine and to provide the parameter indicating the actual intake air pressure to the air system parameter processing device.

7. The apparatus according to claim 1, wherein the decoupling computation device comprises: a sub-device configured to compute the decoupling transfer function as an inverse of the transfer function.

8. The apparatus according to claim 1, wherein the first driving signal is used for controlling an opening degree of an exhaust gas recirculation valve of the exhaust gas recirculation system, and wherein the second drive signal is used for controlling an opening degree of a supercharging valve of the turbocharging system.

9. The apparatus according to claim 1, wherein the apparatus is implemented using at least one of a system-on-chip SoC, an integrated circuit IC, and an application-specific integrated circuit ASIC.

10. A diesel engine, comprising:
a cylinder body;
an intake air pipe coupled to an inlet end of the cylinder body and configured to convey gas to the cylinder body;
an exhaust pipe coupled to an outlet end of the cylinder body and configured to emit exhaust gas from combustion within the cylinder body;
a fuel ejection system coupled to the cylinder body and configured to eject fuel into the cylinder body;
an air system, comprising:
an exhaust gas recirculation system coupled to the exhaust pipe and the intake air pipe and configured to convey a part of the exhaust gas from the exhaust pipe back to the cylinder body via the intake air pipe; and
a turbocharging system coupled to the exhaust pipe and configured to supercharge the intake air pressure of the cylinder body using the exhaust gas from the exhaust pipe; and
a control unit, comprising:
a working condition acquisition device configured to acquire one or more parameters indicating an actual working condition of the diesel engine;
a decoupling computation device coupled to the working condition acquisition device and to receive the one or more parameters from the working condition acquisition device, the decoupling computation device configured to determine a decoupling transfer function by computing a set of coefficients of the decoupling transfer function based on the one or more parameters and a transfer function characterizing the diesel engine, wherein the transfer function is calibrated based on working condition data of the diesel engine in a steady working area;
an air system parameter processing device coupled to the working condition acquisition device and to receive the one or more parameters from the working condition acquisition device, the air system parameter processing device configured to process at least one parameter of the one or more parameters indicating a state of the air system to determine an input to the decoupling transfer device; and
a signal generation device coupled to the decoupling computation device and the air system parameter processing device, the signal generation device to receive the decoupling transfer function from the decoupling computation device and to receive the input to the decoupling transfer function from the air system parameter processing device, the signal generation device configured to generate a first driving signal and a second driving signal according to the decoupling transfer function and the input to the decoupling transfer function, the first driving signal for controlling the exhaust gas recirculation system and the second driving signal for controlling the turbocharging system.

11. A method for controlling an air system of a diesel engine in a steady state, wherein the air system comprises an exhaust gas recirculation system and a turbocharging system, the method comprising:
- acquiring one or more parameters indicating an actual working condition of the diesel engine;
- determining a decoupling transfer function by computing a set of coefficients of the decoupling transfer function based on the one or more parameters and a transfer function characterizing the diesel engine, wherein the transfer function is calibrated based on working condition data of the diesel engine in a steady working area;
- processing at least one parameter of the one or more parameters indicating the state of the air system to determine an input to the decoupling transfer function; and
- generating a first driving signal for controlling the exhaust gas recirculation system and a second driving signal for controlling the turbocharging system based on the decoupling transfer function and the input to the decoupling transfer function.

12. The method according to claim 11, wherein the transfer function of the diesel engine is calibrated based on working condition data of the diesel engine at a steady state working condition equilibrium point in the steady working area that includes at least one steady state working condition equilibrium points.

13. The method according to claim 12, wherein the steady state working condition equilibrium point is an intersection point of an equal intake air pressure curve and an equal exhaust gas recirculation flow curve of the diesel engine in the steady working area.

14. The method according to claim 11, wherein the transfer function includes independent variables including a rotating speed and a fuel ejection ratio of the diesel engine, and wherein acquiring the one or more parameters comprises:
- acquiring a parameter indicating the rotating speed of the diesel engine; and
- acquiring a parameter indicating the fuel ejection ratio of the diesel engine.

15. The method according to claim 11, wherein the parameter indicating the state of the air system comprises an exhaust gas recirculation flow ratio and intake air pressure of the diesel engine, and wherein the processing comprises:
- determining a first error between an actual exhaust gas recirculation flow ratio and a target exhaust gas recirculation flow ratio of the diesel engine;
- performing PID processing to the first error of the exhaust gas flow ratio;
- determining a second error between an actual intake air pressure and a target intake air pressure of the diesel engine; and
- performing PID processing to the second error of the intake pressure error.

16. The method according to claim 15, wherein acquiring the one or more parameters comprises:
- acquiring a parameter indicating the actual exhaust gas recirculation flow ratio of the diesel engine; and
- acquiring a parameter indicating the actual intake air pressure of the diesel engine.

17. The method according to claim 11, wherein computing the decoupling transfer function comprises:
- computing an inverse of the transfer function as the decoupling transfer function.

18. The method according to claim 11, wherein the first driving signal is used for controlling an opening degree of an exhaust gas recirculation valve of the exhaust gas recirculation system, and wherein the second drive signal is used for controlling an opening degree of a supercharging valve of the turbocharging system.

19. A computer program product for controlling an air system of a diesel engine in a steady state, wherein the air system comprises an exhaust gas recirculation system and a turbocharging system, having a program of computer instructions included within a non-transitory computer readable memory medium, such that when the program is executed by an apparatus, the apparatus is caused to:
- acquire one or more parameters indicating an actual working condition of a diesel engine;
- determine a decoupling transfer function by computing a set of coefficients of the decoupling transfer function based on the one or more parameters and a transfer function characterizing the diesel engine, wherein the transfer function is calibrated based on working condition data of the diesel engine in a steady working area;
- process at least one parameter of the one or more parameters indicating the state of the air system to determine an input to the decoupling transfer function; and
- generate a first driving signal for controlling the exhaust gas recirculation system and a second driving signal for controlling the turbocharging system based on the decoupling transfer function and the input to the decoupling transfer function.

* * * * *

UNITED STATES PATENT AND TRADEMARK OFFICE
CERTIFICATE OF CORRECTION

PATENT NO. : 9,874,164 B2
APPLICATION NO. : 14/241428
DATED : January 23, 2018
INVENTOR(S) : Guangdi Hu and Dehui Tong It is certified that error appears in the above-identified patent and that said Letters Patent is hereby corrected as shown below:

On the Title Page

In the Inventors (at Item (75), Lines 1 and 2), delete the two instances of "Shandong (CN)" and insert two instances of --Weifang, Shandong (CN)--.

In the Abstract (at Item (57), Line 5), delete "indicating an practical" and insert --indicating a practical--.

In the Claims

Claim 2, Line 17, delete "equilibrium points" and insert --equilibrium point--.

Claim 5, Line 40, delete "PID" and insert --proportion-integration-differentiation ("PID")--.

Claim 9, Line 6, delete "SoC" and insert --("SoC")--.

Claim 9, Line 6, delete "SoC" and insert --("SoC")--.

Claim 9, Line 7, delete "ASIC" and insert --("ASIC")--.

Claim 12, Line 28, delete "equilibrium points" and insert --equilibrium point--.

Signed and Sealed this
Twelfth Day of June, 2018

Andrei Iancu
*Director of the United States Patent and Trademark Office*